Patented Sept. 15, 1936

2,054,740

UNITED STATES PATENT OFFICE 2,054,740

POLYMERIZATION OF DERIVATIVES OF UNSATURATED ORGANIC ACIDS

John William Croom Crawford, Eaglescliffe, England, assignor to Imperial Chemical Industries Limited, a corporation of Great Britain No Drawing. Application March 29, 1935, Serial No. 13,787. In Great Britain March 28, 1934

5 Claims. (Cl. 260—2)

This invention relates to the production of artificial resins or resinous materials by the polymerization of the nitriles of acrylic acid or its α-alkyl substituted homologues.

The polymerization products of these bodies are liable to be discoloured, and it is an object of the present invention to obviate this disadvantage by providing an improved process for treating the monomeric nitriles whereby the polymerization products obtainable from them have a substantially reduced intensity of colouration.

According to my invention I treat the monomeric nitriles with a suitable oxidizing agent as described below, and I find that nitriles so treated give rise to polymerization products which are usually substantially free from colour. In cases where the colour is not completely removed by my process, the residual colour is of a pale yellowish-green hue which is much less objectionable than the strong yellow or brown colouration observed in the products obtained from the untreated nitriles.

As oxidizing agents for use in my process I use the oxygen acids of manganese, namely manganic or permanganic acid or the salts thereof.

In common with most other olefinic compounds the acrylic nitriles and their homologues are themselves more or less readily attacked by oxidizing agents, but I have found that the liability to discolour on polymerization may be removed by the employment of mild oxidizing conditions insufficient to cause any substantial oxidation of the nitriles. Accordingly the quantity of oxidizing agent employed should be small in proportion to the amount of nitrile undergoing treatment, while the temperature at which the operation is carried out should also be low.

The concentration of oxidizing agent is not critical, but it is convenient to work between oxygen values of $$\frac{N}{5}$$

to $$\frac{N}{10}$$

The quantity of oxidizing agent added may for example range from 0.01 to 0.05 gram equivalents of oxygen per gram molecule of nitrile, according to the degree of discoloration which occurs on polymerizing the untreated material.

In the use of manganates or permanganates as oxidizing agents I have obtained beneficial results from the use of acid, neutral or alkaline solutions, but I find that it is advantageous to employ a solution containing at least enough acid to combine with the alkali resulting from reduction of the oxidizing agent, so that an acid reaction is maintained throughout. The nature of the acid employed is not of great importance, provided that it is unaffected by the presence of the oxidizing agent. Acetic, nitric, phosphoric or sulphuric acids are, for example, suitable for use in the process.

In one method of carrying out my invention, I mix together nitrile and acidified permanganate solution, preferably adding the permanganate solution to the nitrile, with stirring and cooling. Reaction occurs rapidly and a precipitate of manganese dioxide is produced. When all the oxidizing agent has been added the manganese dioxide precipitate may be removed, e. g. by filtering, or it may be dissolved by adding sodium bisulphite. The purified nitrile may then be separated from the aqueous medium, and thereafter worked up further as desired.

The application of my invention is not restricted to the treatment of the nitrile in the absence of other materials, or to the use of any particular method of polymerization. Thus, in the preparation of plasticized polymers, or interpolymers with other polymerizable compounds, the mixture of nitrile with plasticizer or polymerizable compound may be treated with oxidizing agent in the manner described above for the monomeric nitrile alone. Furthermore, the treated monomeric products may subsequently be polymerized by any of the known methods. It may be mentioned, however, that the process of my invention is particularly valuable when polymerization is to be carried out in the presence of organic peroxides, since otherwise the use of this method of polymerization is especially likely to produce discoloured products. The resinous products obtained by the process of the present invention possess the flexibility, transparency and mechanical strength characteristic of the polymerized acrylic nitriles and α-substituted acrylic nitriles. The enhanced clarity of colour which they possess in addition render them, however, particularly suitable for use as celluloid substitutes, for moulding purposes, and for the manufacture of safety glass.

The following example, while not introducing any limitation in the scope of my invention, is illustrative of one method of carrying out the same.

Example 150 parts by volume of $$\frac{N}{10}$$

potassium permanganate, acidified with sulphuric acid, are run into 50 parts by volume of methacrylonitrile, with good agitation and cooling. The resultant mixture is treated with sufficient sodium bisulphite solution to dissolve the precipitate of manganese dioxide, and the aqueous layer is withdrawn from the upper layer of methacrylonitrile. The nitrile is washed with water, and dried over anhydrous sodium sulphate with the addition of 1 per cent. by weight of tannic acid as an antipolymerization agent, after which it is rectified by distillation, the fraction boiling between 89-91° C. being collected. The monomer thus prepared is converted to a colourless or almost colourless polymer by heating at 60-65° C. in presence of 0.5 per cent. by weight of dissolved benzoyl or succinyl peroxide for one week.

The polymer so obtained may be used for machining, e. g. for producing cigarette-holders, umbrella handles and the like, or may be hot-rolled into sheets for subsequent stamping, pressing or cutting.

I claim:—

1. Process for the production of artificial resins of enhanced purity of colour by the polymerization of the nitriles of acrylic acid or its α-alkyl substituted homologues or mixtures thereof, which comprises treating the monomeric nitrile, containing if desired other polymerizable substances or plasticizing agents, with a catalyst of the group consisting of manganic acid, permanganic acid and a salts of these acids prior to polymerization.

2. Process as claimed in claim 1 where the oxidizing agent is a salt of permanganic acid.

3. Process for the production of artificial resins of enhanced purity of colour by the polymerization of the nitriles of acrylic acid or its α-alkyl substituted homologues or mixtures thereof, which comprises treating the monomeric nitrile, containing if desired other polymerizable substances or plasticizing agents, with potassium permanganate prior to polymerization.

4. Process as claimed in claim 3 where sufficient acid is added to the mixture to neutralize the alkali resulting from the reduction of the permanganate and to maintain an acid reaction during the treatment.

5. Process for the production of artificial resins of enhanced purity of colour by the polymerization of methacrylonitrile which comprises treating the methacrylonitrile, prior to polymerization, with a catalyst of the group consisting of manganic acid, permanganic acid and salts of these acids.

JOHN WILLIAM CROOM CRAWFORD.